United States Patent Office 3,809,708
Patented May 7, 1974

3,809,708
CONTROLLED REACTION SYSTEMS
Paul S. Minor, Fort Lauderdale, Fla., assignor to Parkson Corporation, Fort Lauderdale, Fla.
Continuation-in-part of application Ser. No. 9,590, Feb. 9, 1970. This application May 28, 1971, Ser. No. 148,096
Int. Cl. C05b 11/04; C11c 3/12
U.S. Cl. 260—409
11 Claims

ABSTRACT OF THE DISCLOSURE

In the particular embodiments of the invention described herein, gas-liquid reactions are carried out by continuously injecting the normally gaseous reactant into a confined stream of the liquid reactant and passing the gas-liquid mixture through a confined tortuous flow path so as to induce turbulence in the mixture. Typical reactions are ammonia-phosphoric acid reactions and chlorination and hydrogenation reactions.

CROSS REFERENCES TO RELATED APPLICATIONS

This application is a continuation-in-part of application Ser. No. 9,590, filed Feb. 9, 1970.

BACKGROUND OF THE INVENTION

This invention relates to a process for carrying out chemical reaction between gaseous and liquid reactants wherein rapid and intimate mixing of the reactants is required. In the past it has been common practice to carry out gas-liquid reactions in a reaction vessel and to allow the entire batch to react prior to removal of the product. With that process, however, mechanical agitation is usually necessary and hold-up times can be quite long (e.g. an hour or more). The long hold-up times necessary for adequate gas-liquid reaction not only adversely affect the efficiency of the process, but also result in poor selectivity of the product. Thus, the desired product may continue to be exposed to reaction conditions and be further transformed into undesirable products. It is also possible that the conditions within the reaction vessel may become such that the reaction reverses and the desired final product reverts to some intermediate product. Furthermore, even with the long hold-up times, it is frequently impossible in the batch-type method to maintain contact between the reactants for a sufficient time to assure complete reaction.

These difficulties are not avoided by the various continuous reaction methods wherein the reactants are continuously supplied to a reaction vessel and the reaction product is continuously removed. Even in the plug-flow type of continuous reactor, which consists essentially of a simple tube through which the reactants pass, the close temperature and pressure controls and continuous agitation required for many reactions involving gaseous reactants cannot be maintained. In the ammoniation of phosphoric acid to produce ammonium-polyphosphates, for example, the reaction temperature and pressure must be controlled carefully to assure complete reaction while avoiding reversion of the desired polyphosphate product. This cannot readily be accomplished in continuous flow pipes of the type disclosed in the patents to Coon et al. No. 3,125,420, Lutz No. 3,310,371, Kearns No. 3,464,808, Fitch No. 3,420,624 and Hudson No. 3,502,441, since the constituents are not agitated continuously during the reaction and precise temperature and pressure control are not possible in those reactors.

It has been proposed heretofore to carry out liquid-liquid reactions in a plate type heat exchanger, but such apparatus presented many practical difficulties and shortcomings as a reaction vessel. For example, backmixing is more prevalent in liquid-liquid reactions and throughput was felt to be severely limited. Since many gas-liquid reactions are controlled by mass transfer of gas into the liquid phase, and since this rate of transfer under prior art conditions was relatively low, it was erroneously concluded that such apparatus could not be made suitable for gas-liquid reactions and no effeort was made to make such systems. It has now been found, however, that the great reduction in the mass transfer resistance made possible by a properly designed flow path brings on a several fold increase in the overall reaction rate, thus making it possible to carry out a great number of industrially important reactions in this apparatus.

SUMMARY OF THE INVENTION

In accordance with the present invention, a gas-liquid reaction process is provided wherein a gas reactant and a liquid reactant are intermixed and passed continuously through a tortuous flow path so as to induce high turbulence in the mixture and thereby maintain intimate contact between the reactants throughout the reaction period, the temperature and pressure conditions within the flow path being controlled so as to assure substantially complete reaction of the constituents. According to one embodiment of the invention, vegetable oils are hydrogenated by introducing hydrogen into a flowing turbulent stream of the liquid oil within a tortuous flow path to form semi-solids suitable for use in shortening or margarine. In another embodiment, ethylene is chlorinated to form ethylene dichloride. Still another embodiment involves the ammoniation of phosphoric acid to form ammonium phosphate and related products.

BRIEF DESCRIPTION OF THE DRAWINGS

For a more detailed explanation of the invention, reference may be made to the following description of exemplary embodiments taken in conjunction with the figures of the accompanying drawings, in which.

DESCRIPTION OF THE PREFERRED EMBODIMENTS

Figure 1:
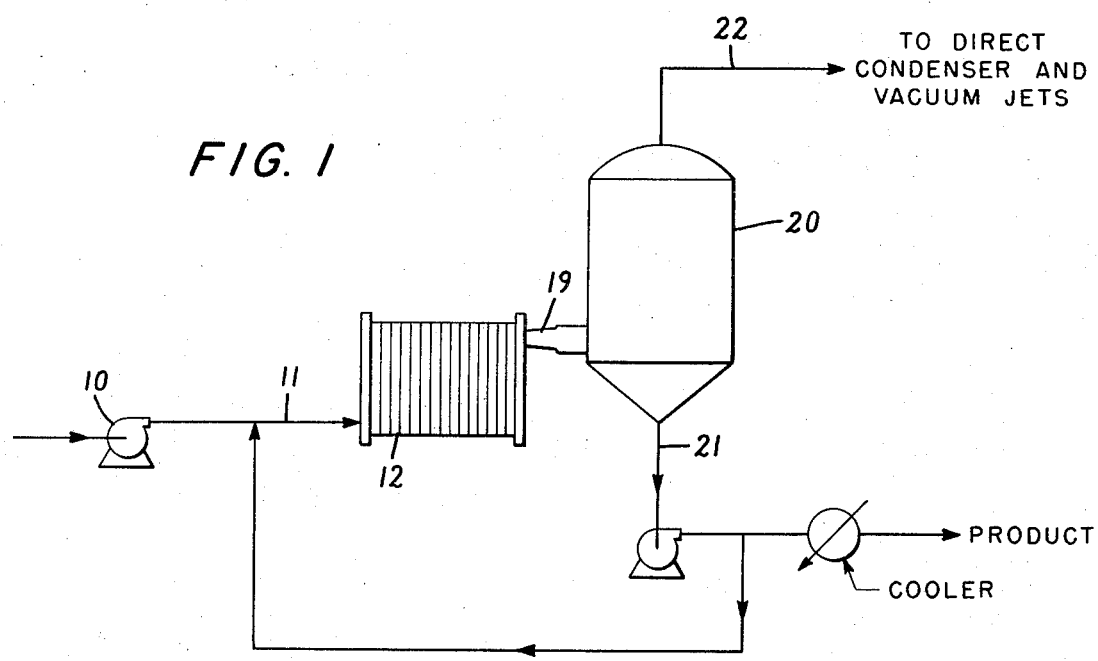
FIG. 1 is a schematic diagram illustrating a representative system including a tortuous path plate reactor for carrying out reactions according to the invention.

The present invention is especially useful in carrying out gas-liquid reactions which require close temperature and pressure control, or a short residence time, or which produce a concentrated or dried molten product, but the advantages of the present invention may also be obtained with many other types of processes. Specific reactions in which the process is useful are ammoniation of hydrocarbons to amines, ammoniation of nitric acid and sulfuric acid, halogenation of hydrocarbons, oxidation of both organic and inorganic components, sulfonation and sulfation reactions, hydrogenation of edible oils, nitration of hydrocarbons with nitrogen dioxide and ammoniation of phosphoric acid to ammonium polyphosphates.

In certain forms of the process, the normally gaseous reactant or reactants are continuously injected into a confined stream of the normally liquid reactant or reactants. In other reactions, a normally gaseous reactant may be introduced into the confined stream in its liquid form or in solution, rather than in gaseous form. It is also possible in some cases to inject the liquid into the gas to obtain the desired results. The reactant mixture passes through a confined tortuous flow path such as a plate-type heat exchanger which has a high surface-to-volume ratio and which induces a high degree of turbulence. The high surface-to-volume ratios contemplated may be expressed by the formula $S/V$ wherein "S" is the surface area of the confining flow path in square feet per foot of length and "V" is the volume in cubic feet contained within this surface area. $S/V$ ratios of at least 50 are necessary in order to obtain the requisite potential for adding heat to or removing heat from the flow path through the flow path surfaces. $S/V$ ratios of at least 75 are preferred since the reactions contemplated may be highly exothermic and at the same time require close temperature control to ensure product selectivity and prevent reversion of the reaction.

It has been found surprisingly that such a flow path offers an ideal gas-liquid reaction environment in that: (1) the high turbulence ensures that all of the gas is contacted with the liquid in a very short time in that the liquid particles have a high surface-to-volume ratio and excellent surface renewal rates, (2) the residence time may be adjusted to allow the reaction to be satisfactorily completed, (3) the high $S/V$ ratio together with high turbulence permits close temperature control by the use of heating or cooling fluids, (4) the configuration of the flow path may be arranged so as to cause a controlled pressure letdown thereby allowing for the release of vapors in a controlled manner, and (5) the turbulent flow and high $S/V$ ratio permit the effective utilization of catalytically activated flow path surfaces. (This feature serves to eliminate the necessity of premixing a catalyst powder with the feed material and subsequently filtering the powder from the product.)

In certain instances, it may be desirable to supply an excess of the gaseous constituent to assure substantially complete reaction of the liquid constituent. In such cases the excess gaseous constituent may be separated from the reaction product and recycled through the process.

Because it is easily adjusted to satisfy any or all of the foregoing requirements, a preferred tortuous flow path is made up of successive passes between the plates of the plate-type heat exchanger, and, by inserting or removing plates and by suitably arranging the connecting portals, a flow path having the desired characteristics may be obtained. Also, because the plates are preferably quite thin to allow for optimum heat transfer characteristics, exotic alloys having certain desired properties (e.g. corrosion resistance, etc.) can be employed without prohibitive capital outlays. An added advantage of the plate type heat exchanger is that it is quite easy to obtain high $S/V$ ratios.

A typical reaction for which the novel process of the present invention is particularly suited is the ammoniation of phosphoric acid to produce ammonium polyphosphate. The process conditions may be varied so as to permit the ammoniation of phosphoric acid having a wide range of $P_2O_5$ concentration and may be further varied so that a variety of fertilizer products may be obtained from a single operation.

Figure 3:
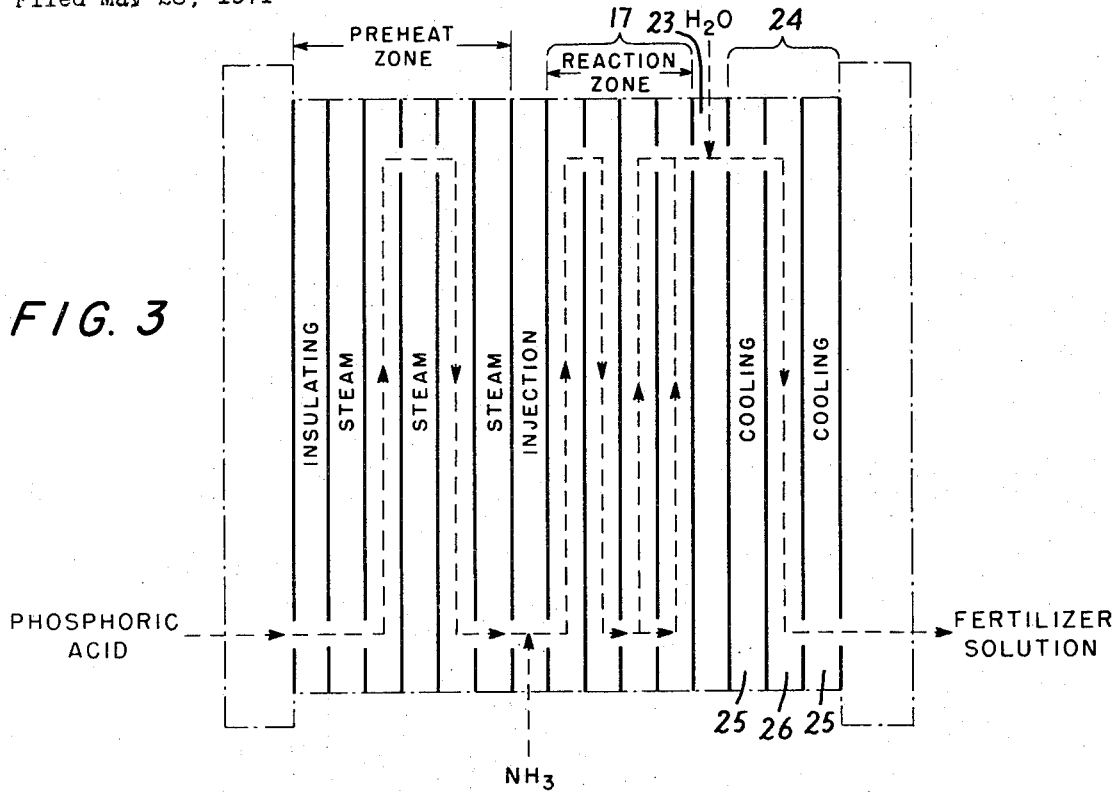
FIG. 3 is a schematic sectional view showing a form of the plate reactor used in the system of FIG. 1 for the ammoniation and concentration of phosphoric acid and the subsequent addition of water to obtain a fertilizer solution.
Figure 4:
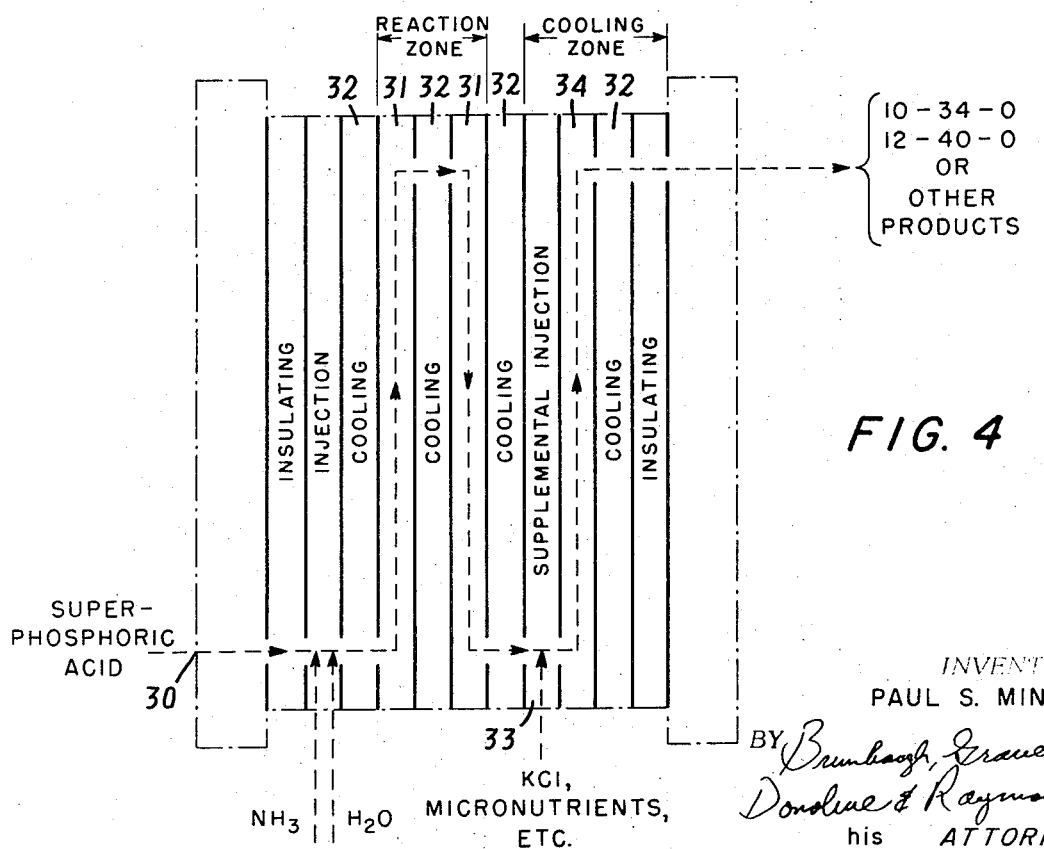
FIG. 4 is a schematic sectional view illustrating a form of the plate reactor used in the system of FIG. 1 for ammoniation of phosphoric acid and the further treatment of the product to obtain various fertilizer materials.

In the representative system illustrated schematically in FIG. 1, a pump 10 supplies phosphoric acid through a feed line 11 into a plate reactor 12 comprising a series of thin metal plates disposed in spaced parallel relation with appropriate gaskets so as to provide a series of narrow material flow passages arranged in the manner described in connection with FIGS. 2, 3, and 4. Where it is desirable to heat or cool the flow path, alternate parallel passes in the reactor may be supplied with a heating or cooling fluid to allow for easy temperature control of the flow path. The plate reactor 12, which may be of the same general type and structure as the plate pack described in the U.S. Pat. No. 3,073,380 to Einar H. Palmason, induces a high degree of turbulence to the stream of phosphoric acid continuously throughout its passage through the reactor. While that Palmason patent describes the general type of plate pack useful in the present invention, certain significant changes in the plate arrangement such as providing a substantially greater $S/V$ ratio, are necessay to render the apparatus suitable for the purposes of the present invention.

Figure 2:
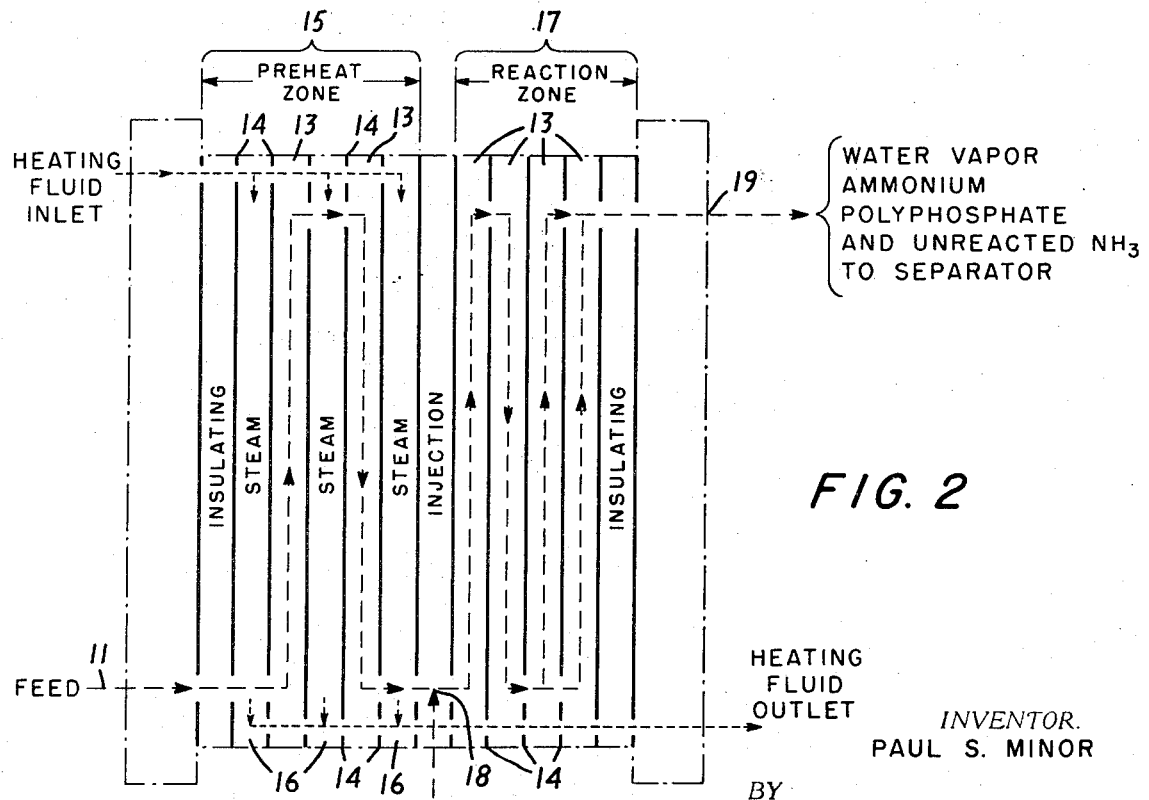
FIG. 2 is a schematic sectional view showing one form of the plate reactor used in the system of FIG. 1 for the ammoniation and concentration of phosphoric acid.

The reactor arrangement schematically depicted in FIG. 2 is a suitable configuration for the ammoniation and concentration of phosphoric acid having a $P_2O_5$ content of from about 32% to about 72% and preferably from 54% to 64%. The phosphoric acid is introduced into the plate reactor through line 11 and enters a confined flow path which is comprised of the adjacent parallel passes 13 between the thin gasketed plates 14 of the reactor.

When ammoniating phosphoric acid having a low to moderate $P_2O_5$ concentration such as 32% to 60%, it is preferable to preheat the phosphoric acid in a preheat zone 15 to a temperature not exceeding about 500° F. prior to the injection of ammonia. Preheating is not necessary if a fairly concentrated feed material (greater than 60% $P_2O_5$) is used or if a low level of polyphosphates (less than 10%) is required. In FIG. 2 steam is supplied from a heating fluid input through three alternate passes 16 so that the walls of the two intervening passes 13 of the flow path are heated.

If desired, the feed acid may be preammoniated without appreciable solids formation to a pH between about 1.3 and 2.5 to reduce its corrosiveness. This preammoniation can be carried out advantageously by scrubbing the effluent ammonia gases from the reactor output with the feed acid to be applied to the line 11 to recover any unreacted ammonia.

In the reactor shown in FIG. 2, two preheat passes of the preheat zone 15 are designated as being in a 1–1 configuration for purposes of description, there being one upwardly directed pass followed by one downwardly directed pass. It will be apparent, however, that the plate configuration may be altered depending upon the conditions required for the process. For example, a reaction zone 17 following the preheat zone of FIG. 2 has a 1–1–2 configuration, there being one upwardly directed pass followed by one downwardly directed pass and thence two upwardly directed passes.

After preheating in the zone 15, the phosphoric acid stream passes out of the preheat zone and into the reaction zone 17. At a point 18 located between the preheat zone and the reaction zone, ammonia is injected into the flowing stream of phosphoric acid. This injection is accomplished most conveniently by using a properly designed and constructed "injection plate," having one or more passageways communicating with the outside of the package through which gaseous, liquid, or aqueous ammonia can be metered, that plate being inserted at the proper location with the plate package. If desired, several injection plates may be included in the plate reaction to permit introduction of constitutents at various locations in the reaction zone. For applications of the type described herein, no special mixing valve or nozzle need be employed in the injection plate since, as will be more fully discussed below, the highly tortuous character of the flow path induces immediate and continuous mixing of the reactants.

Depending upon the desired composition of the product and the $P_2O_5$ concentration of the feed acid, the molar ratio of the injected ammonia to $P_2O_5$ may vary between about .4 to 1 and about 5.8 to 1 and, for normal operation, is preferably about 3.0 to 1. The ammonia-acid mixture passes immediately into the reaction zone 17 where the ammonia reacts vigorously on contact with the phosphoric acid. As mentioned above, the reaction zone is comprised of the narrow parallel passes between the thin gasketed plates. The tortuousness of the flow path within the reaction zone causes extreme turbulence and ensures that all the ammonia is contacted with the phosphoric acid in a very short time. The number of plate passes in the reaction zone is selected so as to assure a flow path of sufficient length to allow for substantial completion of the reaction.

The ammonia reacts exothermally with the phosphoric acid, and in the embodiment of FIG. 2 the temperature within the flow path rises above the vaporization point of water at the prevailing pressures so that water vapor is evolved, the plate configuration being selected so that the proper pressure within the flow path is obtained. This causes the ammonium phosphate to be concentrated to the point where polyphosphates are formed and the desired degree of concentration of the phosphate product can be achieved readily. The 1–1–2 configuration illustrated in FIG. 2 is designed to allow for a gradual pressure drop which, when combined with the temperature increase, facilitates the vapor formation. Generally speaking, temperatures between about 350° F. and about 650° F. are required for polymerization whereas a temperature range of 400° F. and 600° F. is preferred. If a product containing more than 50% polyphosphates is desired, temperatures of at least about 550° F. are necessary.

The evolution of the water vapor in the reaction zone 17 causes an increase in the volume of material within the confined flow path and the material is thus rapidly accelerated toward the outlet 19 of the reactor. A high velocity stream containing a mixture of water vapor, molten ammonium polyphosphate, and any unreacted ammonia emerges from the reactor. As illustrated in FIG. 1, this stream is directed to a conventional cyclonic separator 20. The molten ammonium polyphosphate collects at the bottom of the separator and flows out of the system through a line 21 through which it may pass to a granulator (not shown) following cooling, if desired. The water vapor and any unreacted ammonia are drawn off the top of the separator through a line 22 which leads to a condenser and a vacuum line (not shown). As mentioned above, the gaseous effluent may be scrubbed with the feed acid to extract unreacted ammonia.

Using the process described above, various grades of ammonium phosphate product can be made, depending upon the ratio of ammonia to $P_2O_5$ and the concentration increase desired. In addition, certain changes may be made in the plate package so as to alter the reaction product. For example, as is depicted in FIG. 3, additional plates may be included in the plate package beyond the reaction zone 17 so as to permit the injection of water to quench the reaction product and produce an immediately usable base fertilizer solution, such as 10–34–0. In this case, another injection plate 23 is inserted after the reaction zone 17 to permit introduction of water. From the plate 23 the ammonium polyphosphate-water mixture passes into a cooling zone 24 containing two cooling passes 25 through which a coolant is circulated to cool the walls of an intervening material pass 26. The solution withdrawn from the plate package of this system constitutes a commercially acceptable product ready for final blending.

It will be apparent that other fertilizer solutions having different compositions may be produced in a similar manner by merely adjusting the concentrations and proportions of the reactants and by varying the conditions within the reactor.

The embodiments described above relate to the ammoniation of phosphoric acid solutions having only moderate $P_2O_5$ concentrations. It is also possible, however, to utilize the process according to the invention for the ammoniation of preconcentrated superphosphoric acid having much higher $P_2O_5$ concentrations. To accomplish this, a plate reactor such as is shown in FIG. 4 is employed having no preheat zone. Instead, the first plate in the package is an injection plate 29 through which ammonia is injected into the stream of superphosphoric acid introduced at an inlet port 30. The absence of the preheat zone also makes it possible to inject the ammonia directly into the inlet port if desired. Preferably, the rate at which ammonia is injected is controlled in accordance with the phosphoric acid flow rate so as to obtain a product of optimum pH, normally about 6.0 to 7.0.

When ammoniating superphosphoric acid in this way, it is necessary to cool the material in the passes 31 comprising reaction zone by providing cooling fluid to the alternate passes 32. This cooling removes excess heat resulting from the ammonia-superphosphoric acid reaction and thereby prevents the ammonium polyphosphate from reverting to the orthophosphate form. The high surface-to-volume ratio of the exchanger and the excellent heat conductivity of the thin plates make it possible to maintain the temperature at the end of the reaction zone well below the temperature of about 250° F. at which such reversion becomes significant. Generally speaking, it is preferred that the temperature at the end of the reaction zone is about 110° F. or below.

Although the reaction product is useful by itself, it is often desirable to manufacture a complete composite fertilizer containing other constituents in the same plate package. For this purpose, additional materials, such as water, clay, potassium solutions, micronutrients, and the like, are introduced through a second injection plate 33 in the cooling zone. The composite fertilizer product then passes through a cooling pass 34 and thence out of the reactor. In this way, a complete suspension or solution fertilizer product (e.g., such as 15–15–15 or 7–21–21) can be manufactured from the basic raw materials in one apparatus.

In another embodiment of the invention ethylene is chlorinated to form 1,2 dichloroethane (ethylene dichloride). This chlorination reaction requires precise temperature control since the reaction is highly exothermic and overchlorination (yielding products other than ethylene dichloride) may occur at localized high temperature areas. Also, it is important to maintain the reactants in a uniformly mixed condition as they pass through the reactor since either backmixing or the uneven distribution of the reactants at particular points within the flow path can upset the stoichiometry of the reaction and likewise adversely affect product selectivity.

Figure 5:
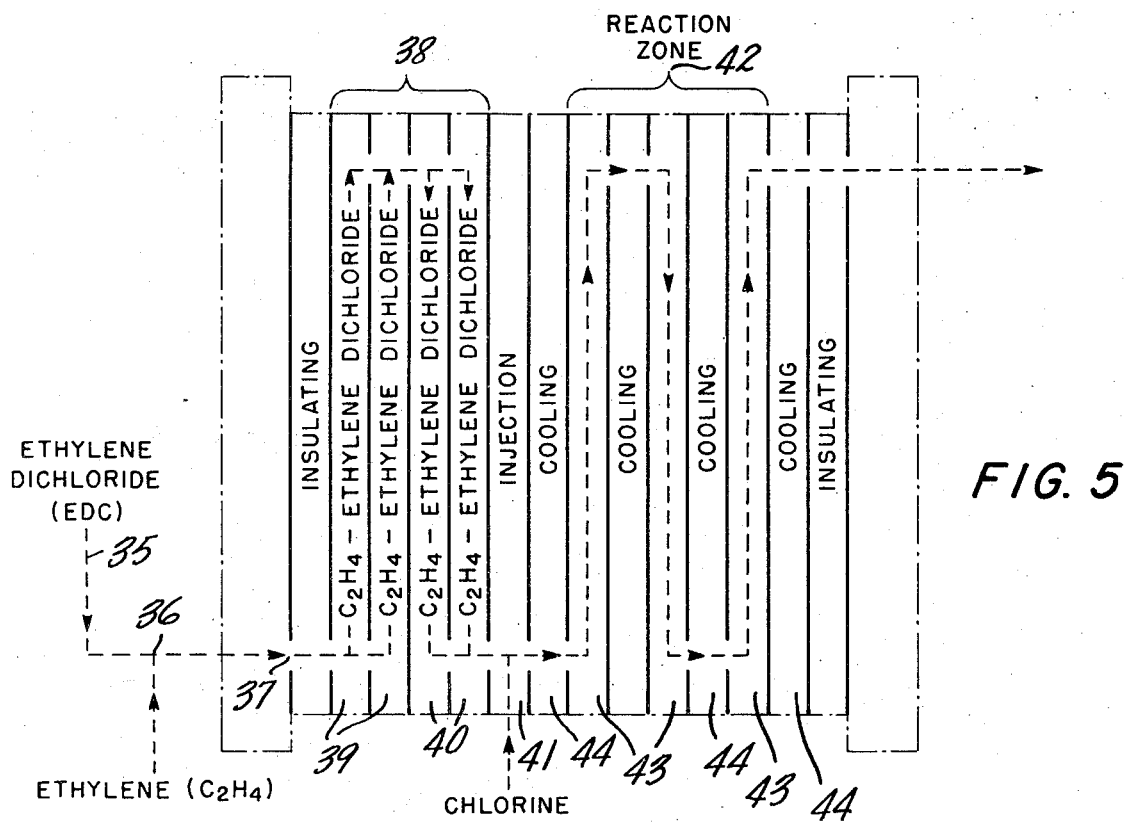
FIG. 5 is a schematic sectional view showing a form of the plate reactor used in the system of FIG. 1 for the chlorination of ethylene to obtain ethylene dichloride.

By employing the process according to the invention, the above requirements can be met. Because the reaction between gaseous ethylene and gaseous chlorine is highly exothermic, indeed explosive, it is preferable to dissolve either the ethylene or the chlorine in liquid ethylene dichloride prior to reacting the ethylene with the chlorine. The ethylenedichloride can be obtained by recycling a portion of the reaction product. Referring to FIG. 5, liquid ethylene dichloride having ferric chloride catalyst dissolved therein is passed through a feed line 35. Gaseous ethylene, for example, is then injected into the ethylene dichloride by an injector 36 just prior to entering the plate reactor through an inlet portal 37. In order to dissolve a portion of the injected ethylene in the ethylene dichloride, the ethylene-ethylene dichloride is first passed through a mixing zone 38 comprising upwardly directed parallel passes 39 and downwardly directed passes 40. The turbulent flow conditions within the mixing zone cause the dissolved ethylene-ethylene dichloride solution to approach very quickly the limit of solubility under the existing temperature and pressure conditions.

Gaseous chlorine is then injected into the ethylene-ethylene dichloride solution by means of an injection plate 41 and the reaction gas-liquid mixture is immediately passed into a reaction zone 42. It will be appreciated that more than one injection plate may be employed so as to more closely control the concentrations of the various reactants at given points within the reaction zone. The reaction zone comprises several alternate parallel passes 43 of the plate reactor so as to provide a high degree of turbulence in the reacting mixture. This turbulence assures that the chlorine will be intimately mixed with the ethylene-ethylene dichloride solution and the ferric chloride catalyst and thus be completely reacted with the ethylene. In order to maintain close temperature control and thus assure high product selectivity, several adjacent parallel passes 44 are provided through which a cooling fluid, preferably water, is passed. Because of the high surface-to-volume ratio within the flow path, the cooling fluid is capable of preventing localized overheating within the flow path and over chlorination resulting in undesirable products is avoided.

Upon emerging from the reaction zone the mixture of gas (now greatly depleted) and liquid is passed into a separator where any remaining gaseous material, such as any inert gas introduced with the feed material, unreacted ethylene, unreacted chlorine, or product gases, are separated from the liquid product.

It will be appreciated that, by suitably balancing the ratio of reactants, either the ethylene or the chlorine can be virtually completely reacted by an excess of the other reactant. Also, by providing a reaction zone of sufficient length, the reaction can be carried substantially to completion so that any unreacted gases represent no significant recycle cost or economic loss.

The production of chlorinated products other than 1,2-dichloroethane is also possible by modifying the reactants, the stoichiometry of the reactants, the catalyst and catalyst concentration, and the reaction temperature. Some of the other reactions contemplated are the chlorination of ethylene dichloride to further chlorinated products such as trichloroethane, tetrachloroethane, pentachloroethane, and hexachloroethane; chlorination of benzene to monochloro, dichloro and higher chlorinated derivatives; chlorination of other cyclic carbon compounds such as dicyclopentadiene; chlorination of methane or partially chlorinated single carbon molecules to methyl or methylene chloride or to chloroform or carbon tetrachloride; chlorination of other aliphatic hydrocarbons; and chlorination of polymeric materials. In many cases, hydrogen chloride is produced as a by-product of the chlorination reaction. In such cases, the evolution of the gaseous by-product enhances the turbulence within the flow path and aids and maintains high flow velocities. It may also be preferred to heat a portion of the flow path so as to heat a reactant or the reactant mixture and thus facilitate the initiation of the chlorination reaction.

In another preferred embodiment of the invention, edible oils such as vegetable oil are hydrogenated to form semi-solid fats suitable for use in the manufacture of shortening or margarine. Other fats and fatty acids can, likewise, be hydrogenated to obtain useful products. This hydrogenation of oils, fats, fatty acids or derivatives thereof according to the invention offers unique advantages in that the turbulent flow characteristics of the flow path enhance the dissolution of the hydrogen in the oil. It is generally believed that the hydrogenation reaction occurs after the hydrogen is dissolved in the oil in the presence of a catalyst. Furthermore, the close temperature control made possible by the invention combined with the surprising absence of backmixing of the reactants (resulting in substantial plug flow) yields a high degree of product selectivity.

Figure 6:
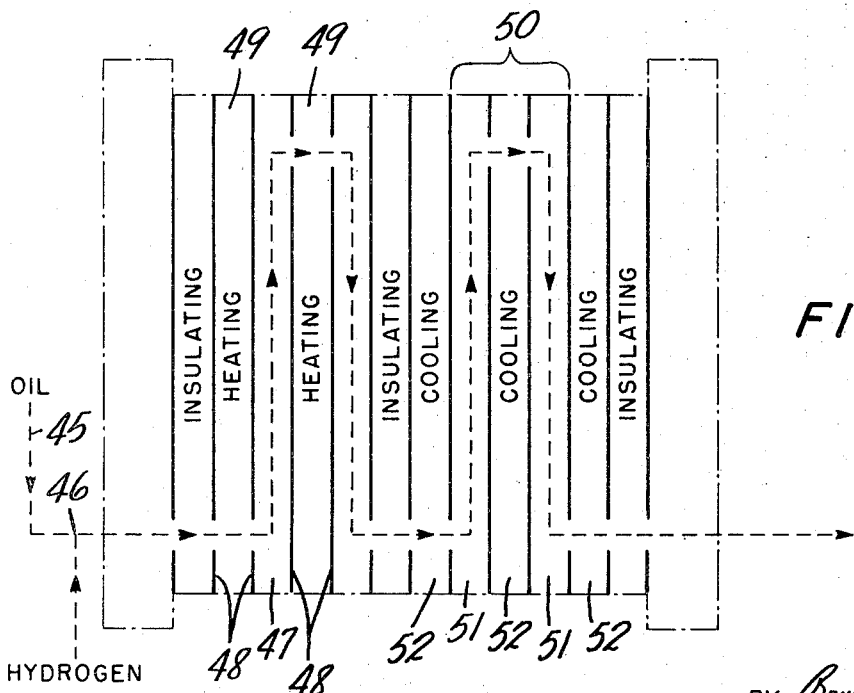
FIG. 6 is a schematic sectional view showing a form of the plate reactor used in the system of FIG. 1 for hydrogenation of vegetable oil to obtain semi-solids for use in the manufacture of shortening or margarine.

Referring to FIG. 6, a liquid oil having a suitable catalyst mixed therewith is passed through a feed line 45 to the plate-type reactor. As the oil enters the reactor, gaseous hydrogen is injected into the oil through an injector 46. This mixture of hydrogen, edible oil, and catalyst then passes through a preheating pass 47 in which the proper temperature for the initiation of the reaction is reached. Heat is supplied to the heating pass 47 through a series of parallel plates 48 forming several alternate passes 49 through which a heating fluid such as oil or steam is circulated. As the reaction is carried out, the mixture passes through a reaction zone 50 comprising a series of parallel passes 51. The temperature in these passes is closely controlled by a series of alternate cooling passes 52 through which a cooling fluid such as water is passed. Also, injection points can be provided along the flow path for the addition of hydrogen or liquid reactant thus allowing further control of reaction selectivity or product properties through proper control of reactant concentration. The final mixture of hydrogenated oil and the catalyst and any unreacted hydrogen is then passed to a separator where any unreacted hydrogen is removed for recycle or other use and the product is drawn off in liquid form, filtered to remove the catalyst, and cooled to solidify the product.

Normally substantially all of the hydrogen will react with the oil and very little, if any, will be obtained from the separation. This result, which is quite surprising and unexpected in view of the very short residence time in the reactor, can be attributed to the high turbulence imparted by the tortuous flow path combined with the plug flow characteristic which is not ordinarily obtainable in other types of continuous reaction processes.

An important modification of the above-described hydrogenation reaction, available only with the process of the present invention utilizes flow path surfaces which are catalytically activated (either by activation of the surface itself or by coating the surface with a catalyst). With this process it is possible to carry out hydrogenation reaction without premixing the catalyst with the oil or filtering it from the final product.

Particular examples of constituents, conditions and results for various reactions carried out in accordance with the present invention are as follows:

EXAMPLE 1

Concentration and ammoniation of 54% $P_2O_5$ wet process acid containing 2.7% solids Plate arrangement:
  Preheat _____ 1–1.
  Reaction _____ 1–1–2.
$S/V$ ratio (ft.$^2$/ft.$^3$) _____ 210.
Preheat medium _____ 120 p.s.i.g. steam.
Preheat surface _____ 5.2 ft.$^2$
Reaction path length _____ 6 feet.
Feed rate:
  $NH_3$ _____ 48 lbs./hr.
  54% $P_2O_5$ acid _____ 279 lbs./hr.
Feed pressure _____ 54 p.s.i.g.
Temperature of feed:
  $NH_3$ _____ 70° F.
  54% $P_2O_5$ acid _____ 87° F.
Temperature in line between pack and separator _____ 395° F.
Liquid temperature out of separator __ 395° F.
Pressure in separator _____ Atmospheric.
Condensate rate _____ 63 lbs./hr.
pH of condensate _____ 6.8.
Product pH _____ 4.0.
Unreacted $NH_3$ _____ None detected.
Product rate _____ 264 lbs./hr.

The final product was a dark colored solid analyzing 15% N and 57.1% $P_2O_5$ with 19% of the $P_2O_5$ in non-ortho form.

EXAMPLE 2

Concentration, ammoniation and dilution of 54% $P_2O_5$ wet process phosphoric acid containing 2.7% solids to provide a fertilizer solution Plate arrangement:
  Preheat _____ 1–1.
  Reaction _____ 1–1–2.
  Cooling _____ 2–2–2.
S/V ratio (ft.$^2$/ft.$^3$) _____ 210.
Preheat surface _____ 5.2 ft.$^2$.
$NH_3$ injection _____ At end of preheat.
$H_2O$ injection _____ At end of reaction.
Reaction path length _____ 6 feet.
Feed rate:
  $NH_3$ _____ 54 lbs./hr.
  $H_2O$ _____ 110 lbs./hr.
  54% $P_2O_5$ acid _____ 279 lbs./hr.
Feed pressure _____ 54 p.s.i.g.
Temperature of feed:
  $NH_3$ _____ 70° F.
  Acid _____ 87° F.
Liquid temperature out of package __ 110° F.
Pressure out of separator _____ 27″ Hg vacuum.
pH of liquid product _____ 6.3.
Fertilizer product rate _____ 443 lbs./hr.

EXAMPLE 3

Ammoniation and dilution of furnace grade superphosphoric acid analyzing 75% $P_2O_5$ to give a fertilizer solution containing ammonia and polyphosphates Plate configuration _____ 1–1–1 reaction with $NH_3$ and water injection and water cooling.
S/V ratio (ft.$^2$/ft.$^3$) _____ 210.
Reaction path length _____ 6 feet.
Feed rate:
  $NH_3$ _____ 28 lbs./hr.
  $H_2O$ _____ 102 lbs./hr.
  75% $P_2O_5$ acid _____ 137 lbs./hr.
Feed pressure _____ 8 p.s.i.g.
Temperature in line between pack and separator _____ 95° F.
Temperature of product out of separator _____ Do.
Product rate _____ 246 lbs./hr.
Product pH _____ 5.7.
Cooling $H_2O$ in _____ 76° F.
Cooling $H_2O$ out _____ 125° F.

The product analyzed 9.4 N and 38.6% $P_2O_5$.

EXAMPLE 4

Ammoniation of furnace grade superphosphoric acid analyzing 75% $P_2O_5$ with the pH of the product carefully controlled at 6.2

Plate configuration _____ 1–1–1 reaction path with $NH_3$ and water injection, and water cooling.
S/V ratio (ft.$^2$/ft.$^3$) _____ 210.
Reaction path length _____ 6 feet.
Feed rate:
  $NH_3$ _____ 39 lbs./hr.
  $H_2O$ _____ 127 lbs./hr.
  75% $P_2O_5$ acid _____ 137 lbs./hr.

Temperature in line between pack and separator _____ 95° F.
Temperature of product out of separator _____ Do.
Product rate _____ 303 lbs./hr.
Product pH _____ 6.2.
Cooling $H_2O$ in _____ 75° F.
Cooling $H_2O$ out _____ 124° F.

The product analyzed 10% N and 34% $P_2O_5$. No solids precipitated after two months storage. The polyphosphate reversion was below 3%.

EXAMPLE 5

Ammoniation and dilution of superphosphoric acid and addition of other materials to provide a composite fertilizer product Plate configuration _____ 2–2–2 reaction and blending.
S/V ratio (ft.$^2$/ft.$^3$) _____ 210.
Cooling, reaction, blending path length _____ 6 feet.
Feed materials:
  $NH_3$ _____ 47 lbs./hr.
  Urea-ammonium nitrate solution (32–0–0) _____ 237 lbs./hr.
  $H_2O$ _____ 72 lbs./hr.
  75% $P_2O_5$ acid _____ 150 lbs./hr.
  Attapulgite clay (suspended in $H_2O$ feed) _____ 8 lbs./hr.
Temperature of product out of pack _____ 95° F.
Product rate _____ 514 lbs./hr.
Cooling $H_2O$ in _____ 75° F.
Cooling $H_2O$ out _____ 123° F.

The resulting product, containing 22% N and 22% $P_2O_5$ can be mixed with KCl and water to give a 15–15–15 suspension fertilizer.

EXAMPLE 6

Technical grade ethylene was chlorinated in a tortuous flow path plate-type reactor arranged in accordance with FIG. 5 having an S/V ratio of 298 ft.$^2$/ft.$^3$. The following data were obtained:

$C_2H_4$ feed _____ lbs./hr __ 6.0
Chlorine feed _____ lbs./hr __ 21
EDC recycle _____ lbs./hr __ 280
Feed pressure _____ p.s.i.g __ 17
Reaction temperature _____ ° F __ 190
Cooling water temperature _____ ° F __ 83
Product rate _____ lbs./hr __ 26
HCl produced _____ lb./hr __ 1
Analysis of product by gas chromatograph:
  Light chlorinated products _____ wt. percent __ 95
  Ethylene dichloride _____ do ____ 89.0
  1,1,2 trichloroethane _____ do ____ 9.93
  Heavier chlorinated products _____ do ____ 12
Length of EDC-$C_2H_4$ mix path _____ inches ____ 41
Length of reaction path _____ do ____ 41

EXAMPLE 7

Several runs were made in order to demonstrate the utility of the invention in conjunction with hydrogenation of vegetable oil, using Harshaw Nysel catalyst (25% Ni) mixed with the oil. The results of these test runs are as follows:

Plate configuration: 1–1–1–1–1–1–1–1–1
S/V ratio (ft.$^2$/ft.$^3$): 298
Flow path length: 126″

| Run number | 1 | 2 | 3 | 4 | 5 | 6 | 7 | 8 | 9 | 10 | 11 | 1 |
|---|---|---|---|---|---|---|---|---|---|---|---|---|
| Reaction temp., °F | 345 | 414 | 452 | 451 | 501 | 500 | 517 | 560 | 551 | 561 | 550 | 552 |
| Reaction press, p.s.i.g | 11 | 32 | 32 | 14.5 | 15.0 | 35.0 | 35 | 36 | 15 | 39 | 35.0 | 36.0 |
| Residence time, sec | 4.9 | 2.7 | 2.6 | 1.6 | 1.6 | 5.2 | 2.7 | 2.6 | 1.5 | 6.4 | 5.0 | 8.2 |
| Velocity, ft./sec | 6.1 | 11.0 | 11.6 | 18.0 | 19.0 | 5.8 | 11.3 | 11.5 | 19.8 | 4.7 | 6.0 | 3.7 |
| Flow rates, p.p.h.: | | | | | | | | | | | | |
| $H_2$ | 0.25 | 0.52 | 0.53 | 0.55 | 0.55 | 0.25 | 0.53 | 0.55 | 0.55 | 0.26 | 0.25 | 0.14 |
| Oil | 9.1 | 55.0 | 60.0 | 52.5 | 42.0 | 54.0 | 48.0 | 49.6 | 47.3 | 11.2 | 101.0 | 12.1 |
| Iodine value feed | 134.5 | 134.5 | 134.5 | 134.5 | 134.5 | 134.5 | 134.5 | 134.5 | 134.5 | 134.5 | 134.5 | 134.5 |
| Iodine value product | 104.7 | 106.8 | 102.5 | 114.0 | 112.5 | 104.0 | 96.0 | 100.0 | 108.0 | 74.7 | 112.5 | 106.7 |
| Catalyst conc. wt. percent Ni | 0.1 | 0.1 | 0.1 | 0.1 | 0.1 | 0.1 | 0.1 | 0.1 | 0.1 | 0.1 | 0.1 | 0.1 |

The difference in the iodine values for the feed material and the product illustrates the extent of the hydrogenation resulting from the process.

In order to show the product selectivity of the hydrogenation reactions according to the invention, the products from runs 3, 6, 8, and 11 were analyzed as follows. It should be noted that the product obtained in run 11 approximates that of a commercial margarine. Thus, the relative amount of oleic acid (C–18:1) has been maximized with relatively little formation of stearic acid (C–18:0).

| Run number | 3 | 6 | 8 | 11 |
|---|---|---|---|---|
| M.P., °F | 77.0 | 72.7 | 84.2 | 104.4 |
| I.V. | 103.2 | 107.4 | 92.0 | 72.0 |
| Solids content index: | | | | |
| 50° F | 5.6 | 3.8 | 13.9 | 49.7 |
| 70° F | 1.7 | 0.9 | 5.4 | 36.2 |
| 80° F | 0.9 | 0.5 | 2.6 | 30.5 |
| 92° F | 0.0 | 0.0 | 0.4 | 14.8 |
| 102° F | 0.0 | 0.0 | 0.4 | 4.3 |
| Fatty acid compositions by gas chromatography: | | | | |
| C–12 | 0.3 | 0.2 | 0.2 | 0.2 |
| C–14 | 0.2 | 0.2 | 0.2 | 0.2 |
| C–16 | 12.1 | 10.6 | 11.3 | 10.3 |
| Unknown | 0.2 | 0.4 | 0.2 | 0.2 |
| Do | 0.1 | 0.3 | 0.1 | 0.1 |
| C–18:0 (stearic) | 4.2 | 4.6 | 5.3 | 9.9 |
| C–18:1 (oleic) | 48.6 | 44.2 | 59.1 | 74.1 |
| C–18:2 (linoleic) | 30.7 | 34.2 | 21.7 | 3.9 |
| C–20:0 | Trace | Trace | Trace | 0.4 |
| C–18:3 | 3.1 | 4.0 | 1.4 | 0.4 |
| Unknown | | 0.7 | | |
| C–22 | 0.5 | 0.6 | 0.5 | 0.3 |

It will be apparent that the reaction conditions can be controlled to obtain either selective or non-selective hydrogenation. Furthermore, many other gas-liquid reactions may be carried out in accordance with the invention, the foregoing examples being merely illustrative. Especially advantageous results, not generally available with other processes, are obtained when the reaction requires careful temperature and pressure control, thorough and rapid mixing of constituents, complete utilization of one of the reactants, or limited exposure of the product to one or more of the reactant materials.

I claim:

1. A process for reacting a gas with a liquid comprising continuously intermixing at least one normally gaseous reactant with at least one liquid reactant, passing the mixture through a tortuous flow path comprising successive parallel passes within a plate-type reactor and having an S/V ratio of at least 50.0 so as to assure a high degree of turbulence in the mixture, controlling the temperature and pressure within the flow path so as to achieve a substantial conversion of reactants, and removing the reaction product from the tortuous flow path.

2. A process according to claim 1 including the step of continuously injecting the gaseous reactant into a confined stream of the liquid reactant.

3. A process according to claim 1 including the steps of injecting an excess of the gaseous reactant above that required for the reaction, separating the unreacted excess from the reaction product, and recycling the excess gaseous reactant through the process.

4. A process according to claim 1 including the step of continuously injecting the liquid reactant into a confined stream of the gaseous reactant.

5. A process according to claim 1 including the step of passing the gas liquid mixture through successive parallel passes within a plate-type reactor.

6. A process according to claim 1 including the step of dissolving the normally gaseous reactant in a liquid prior to mixing it with the other reactant.

7. A process according to claim 1 for the hydrogenation of oils, fats, and their derivatives and mixtures thereof including the steps of intermixing gaseous hydrogen with a stream of the liquid reactant, passing the resultant mixture through a tortuous flow path so as to induce or maintain turbulence in the mixture, controlling the temperature and pressure within the flow path so as to initiate the reaction and produce hydrogenated products, and removing the reaction product and any unreacted $H_2$ from the tortuous flow path.

8. A process according to claim 7 including the steps of passing the oil and hydrogen mixture through a heated flow path so as to heat the mixture and initiate the reaction, and thereafter passing the reacting mixture through a cooled tortuous flow path so as to remove a portion of the exothermic heat of reaction from the reacting mixture.

9. A process according to claim 7 including the step of intermixing the liquid reactant and a suitable catalyst prior to the intermixing of the gaseous hydrogen with the liquid reactant.

10. A process according to claim 7 wherein the surfaces of the tortuous flow path are catalytically active and including the steps of passing the liquid reactant and hydrogen mixture through the flow path and causing the mixture to impinge upon the activated flow path surfaces to obtain the desired reaction.

11. A process according to claim 1 wherein the surfaces of the tortuous flow path are catalytically activated and including the steps of passing the gas-liquid mixture through a flow path and causing the mixture to impinge upon the catalytically active flow path surfaces to obtain the desired reaction.

References Cited

UNITED STATES PATENTS

| 3,089,755 | 5/1963 | Gfeller | 260—409 |
| 3,497,327 | 2/1970 | Kehse | 260—409 |
| 3,634,471 | 1/1972 | Kehse | 260—409 |
| 3,701,793 | 10/1972 | Schmidt et al. | 260—409 |

ELBERT L. ROBERTS, Primary Examiner

U.S. Cl. X.R.

260—94.9; 71—34

PO-1050
(5/69)

UNITED STATES PATENT OFFICE
CERTIFICATE OF CORRECTION

Patent No. 3,809,708      Dated May 7, 1974

Inventor(s) Paul S. Minor

It is certified that error appears in the above-identified patent and that said Letters Patent are hereby corrected as shown below:

Column 1, line 29, "reaction" should be --reactions--.
    Column 4, line 70, "reaction" should be --reactor--.
    Column 5, line 13, "turbulenece" should be --turbulence--.
    Column 8, line 6, "pases" should be --passes--.
    Column 9, line 38, "NH" should be --$NH_3$--; line 39, "injectior" should be --injection--. Column 10, line 58, "Light" should be --Lighter--. Column 12, line 1, "1" should be --12--; line 2, "552" should be --557--; claim 5, lines 20, 21 and 22 should be deleted.

Signed and sealed this 24th day of September 1974.

(SEAL)
Attest:

McCOY M. GIBSON JR.            C. MARSHALL DANN
Attesting Officer               Commissioner of Patents